United States Patent
Fu et al.

(10) Patent No.: US 11,245,633 B2
(45) Date of Patent: Feb. 8, 2022

(54) METHOD AND WIRELESS DEVICE FOR HANDLING TRANSMISSION OF DATA

(71) Applicant: TELEFONAKTIEBOLAGET LM ERICSSON (PUBL), Stockholm (SE)

(72) Inventors: Jing Fu, Solna (SE); Selim Ickin, Stocksund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 71 days.

(21) Appl. No.: 16/326,296

(22) PCT Filed: Aug. 18, 2016

(86) PCT No.: PCT/SE2016/050770
§ 371 (c)(1),
(2) Date: Feb. 18, 2019

(87) PCT Pub. No.: WO2018/034604
PCT Pub. Date: Feb. 22, 2018

(65) Prior Publication Data
US 2019/0222527 A1    Jul. 18, 2019

(51) Int. Cl.
*H04L 12/841* (2013.01)
*H04M 15/00* (2006.01)
(Continued)

(52) U.S. Cl.
CPC ......... *H04L 47/283* (2013.01); *H04L 12/14* (2013.01); *H04L 12/1403* (2013.01);
(Continued)

(58) Field of Classification Search
CPC .......... H04L 47/283; H04L 47/2441; H04W 72/1257
See application file for complete search history.

(56) References Cited

U.S. PATENT DOCUMENTS 7,843,828 B2 * 11/2010 Key .............. H04L 47/10
                                                  370/235
10,200,272 B1 * 2/2019 Trundle ........... H04L 43/50
(Continued)

FOREIGN PATENT DOCUMENTS

CN        101917742 A      12/2010
CN        102164359 A       8/2011
(Continued)

OTHER PUBLICATIONS

International Search Report and Written Opinion issued in Application No. PCT/SE2016/050770 dated Apr. 12, 2017, 13 pages.

*Primary Examiner* — Zhiren Qin
(74) *Attorney, Agent, or Firm* — Rothwell, Figg, Ernst & Manbeck, P.C.

(57) ABSTRACT

A method and a wireless device (100) for handling transmission of data. The cost for transmitting the data from the wireless device (100) can be reduced or even minimized by delaying (1:3) transmission until the transmission cost becomes lower, provided that the data can wait without becoming obsolete or useless at the receiving side. This is made possible by determining a delay tolerance of the data and determining a cost prediction for transmission (1:6) within said delay tolerance, e.g. when a cheaper connection (1:4) is used. Advantages may include reduced price to pay for the transmission, less energy consumption, and avoided usage of precious radio resources and network resources at times when the traffic load is high.

22 Claims, 5 Drawing Sheets

(51) Int. Cl.
  *H04L 12/851*    (2013.01)
  *H04L 12/14*     (2006.01)
  *H04L 12/853*    (2013.01)
  *H04W 4/24*      (2018.01)
  *H04W 28/02*     (2009.01)
  *H04W 72/12*     (2009.01)

(52) U.S. Cl.
  CPC ...... *H04L 47/2416* (2013.01); *H04L 47/2441* (2013.01); *H04M 15/00* (2013.01); *H04M 15/8044* (2013.01); *H04W 4/24* (2013.01); *H04W 28/0268* (2013.01); *H04W 72/1257* (2013.01); *H04W 28/0226* (2013.01)

(56) References Cited

U.S. PATENT DOCUMENTS

| | | | |
|---|---|---|---|
| 2001/0009855 A1 | 7/2001 | I'Anson | |
| 2006/0270385 A1 | 11/2006 | Morris | |
| 2009/0052374 A1* | 2/2009 | Takeda | H04L 45/26 370/328 |
| 2012/0140635 A1* | 6/2012 | Aoki | H04L 45/125 370/238 |
| 2013/0217430 A1 | 8/2013 | Beale | |
| 2013/0324104 A1 | 12/2013 | Cavilla et al. | |
| 2014/0050147 A1 | 2/2014 | Beale | |
| 2014/0099884 A1 | 4/2014 | Lozano et al. | |
| 2014/0105083 A1* | 4/2014 | Krishnaswamy | H04W 40/10 370/311 |
| 2014/0303892 A1* | 10/2014 | Morlock | G01C 21/20 701/533 |
| 2015/0146611 A1* | 5/2015 | Joshi | H04L 41/5029 370/328 |
| 2015/0215738 A1 | 7/2015 | Frusina et al. | |
| 2016/0227464 A1* | 8/2016 | Senarath | G08G 1/096775 |
| 2016/0380892 A1* | 12/2016 | Mahadevan | H04L 45/02 370/389 |
| 2017/0142555 A1* | 5/2017 | Ljung | H04W 4/027 |
| 2017/0245187 A1* | 8/2017 | Iwai | H04W 8/065 |
| 2017/0295104 A1* | 10/2017 | Hampel | H04L 47/24 |
| 2018/0302194 A1* | 10/2018 | Wang | H04L 1/1664 |

FOREIGN PATENT DOCUMENTS

| | | |
|---|---|---|
| GB | 2484496 A | 4/2012 |
| KR | 20150086079 A | 7/2015 |

* cited by examiner

| Data piece | Data size | Delay tolerance |
|---|---|---|
| 1 | 10 MB | 30000 |
| 2 | 100 kB | 12000 |
| 3 | 500 kB | 0 |
| 4 | 100 kB | 1200 |

| Time | 06-09 | 09-16 | 16-23 | 23-06 |
|---|---|---|---|---|
| Cell A | 5 | 8 | 10 | 2 |
| Cell B | 6 | 3 | 8 | 2 |
| Cells in city x | 5 | 8 | 8 | 1 |
| Wifi 1 | 0 | 0 | 0 | 0 |
| Wifi 2 | 1 | 1 | 1 | 0 |

METHOD AND WIRELESS DEVICE FOR HANDLING TRANSMISSION OF DATA

CROSS REFERENCE TO RELATED APPLICATION

This application is a 35 U.S.C. § 371 National Stage of International Application No. PCT/SE2016/050770, filed Aug. 18, 2016, designating the United States, the disclosure of which is incorporated by reference.

TECHNICAL FIELD

The present disclosure relates generally to a method and a wireless device for handling transmission of data.

BACKGROUND

In this description, the term "wireless network" is used to denote any network comprising network nodes such as base stations, access points or the like which are capable of wireless communication with wireless devices. For example, the wireless network may be a cellular network providing radio coverage in different cells arranged across an extended area, or a WiFi network providing radio coverage in smaller local areas commonly referred to as "hotspots". Further, the term "wireless device" is used herein to denote any communication equipment that is capable of wireless communication with a wireless network.

In the field of wireless communication, it is becoming increasingly common to employ battery powered so-called Machine-to-Machine, M2M, devices, also known as Machine Type Communication, MTC, devices, for monitoring an area or process. The M2M devices typically send measurements and observations over a wireless network, to be processed by some central control node or the like which may be operating in a cloud environment. An M2M device may for example be configured to measure and report some metric or parameter of interest, such as temperature, pressure, voltage, battery level, light, motion, sound, distance to objects, etc., and to operate in response to some control signals received from the control node, to mention a few illustrative examples.

It is not uncommon that M2M devices are configured to operate automatically and autonomously for long periods of time, which may include reporting considerable amounts of data on a regular basis. For such M2M devices it is a problem that the battery in the device is drained due to consumption of power when transmitting the data. As a result, the battery may frequently need to be manually replaced or recharged to ensure continued operation, which is a problem particularly when a great number of M2M devices are installed at various fixed or moving positions such as in a vehicle. It may thus require substantial efforts to frequently recharge or replace batteries in multiple M2M devices or the like. The energy consumption may further be difficult to predict, e.g. due to fluctuating radio conditions or unforeseen amounts of data to be transmitted.

Other types of wireless devices such as mobile phones, smartphones, tablets, portable computers, etc., may also be configured to transmit considerable amounts of data over a radio link from time to time, e.g. in a backup operation or to provide some basis for statistics or analysis, to mention a few examples. In another example, a user of a wireless device may want to upload some content to a server, such as a collection of images or a video taken by a camera function in the device, which likewise results in transmission of some quantities of data from the wireless device.

SUMMARY

It is an object of embodiments described herein to address at least some of the problems and issues outlined above. It is possible to achieve this object and others by using a method and a node as defined in the attached independent claims.

According to one aspect, a method is performed by a wireless device for handling transmission of data. In this method the wireless device determines a delay tolerance of the data to be transmitted. The wireless device also determines a cost prediction for at least one candidate connection for transmission of the data within said delay tolerance of the data. The wireless device then decides whether to transmit the data immediately or at a later time within the determined delay tolerance, based on the determined delay tolerance and cost prediction. The wireless device finally transmits the data according to the above decision.

According to another aspect, a wireless device is arranged to handle transmission of data. The wireless device is configured to determine a delay tolerance of the data to be transmitted, and to determine a cost prediction for at least one candidate connection for transmission of the data within said delay tolerance of the data. The wireless device is further configured to decide whether to transmit the data immediately or at a later time within the determined delay tolerance, based on the determined delay tolerance and cost prediction, and to transmit the data according to the above decision.

The above method and wireless device may be configured and implemented according to different optional embodiments to accomplish further features and benefits, to be described below.

A computer program storage product is also provided comprising instructions which, when executed on at least one processor, cause the at least one processor to carry out the method described above.

BRIEF DESCRIPTION OF DRAWINGS

The solution will now be described in more detail by means of exemplary embodiments and with reference to the accompanying drawings, in which.

DETAILED DESCRIPTION

Figure 1:
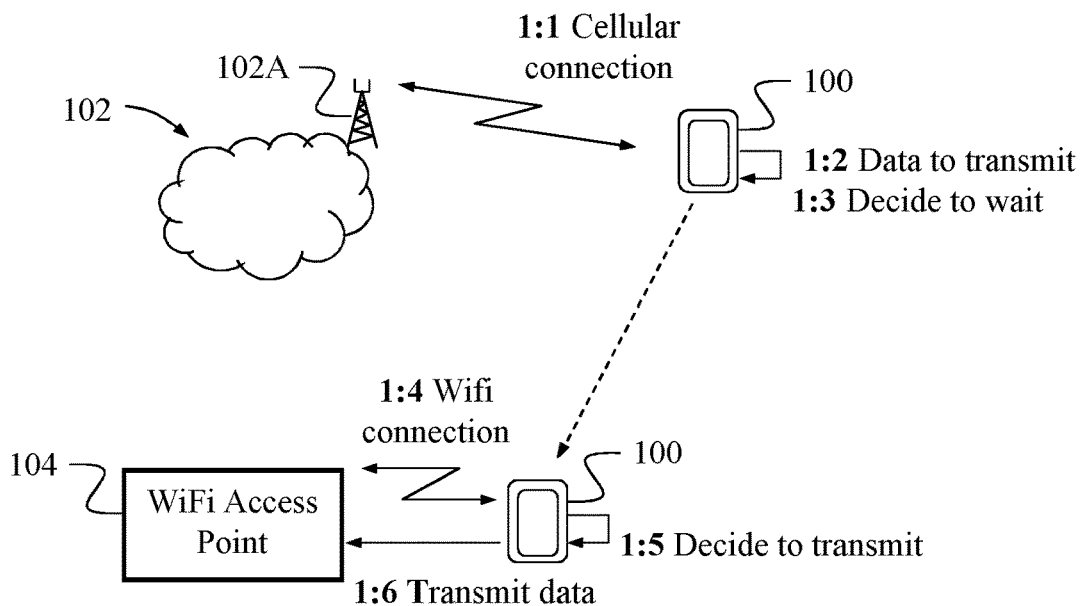
FIG. 1 is a communication scenario illustrating an example of how the solution may be employed, according to some possible embodiments.

Briefly described, a solution is provided to enable a wireless device to transmit data in a cost-efficient manner, so as to avoid unnecessarily high cost for the transmission, e.g. due to high price ratings, costly resource usage, or high energy consumption. In this description the term "cost" is thus not restricted to price ratings applied in the wireless network used but may also refer e.g. to energy consumption and usage of network resources and radio resources.

For example, the cost for transmission of data is generally dependent on which radio technology is used and also on how much transmission power is needed due to the current radio conditions and the distance to a base station or access point that is currently serving the wireless device to receive the transmitted data and forward it towards a receiving party. The cost for transmission of data may further vary over time due to various more or less dynamic factors such as fluctuating radio conditions, varying distance to a serving base station or access point, adaptive price ratings and variations in the traffic load. Such variations of the transmission cost may include both long-term and short-term variations.

Another factor that impacts the cost for transmission of data is the amount of overhead signaling and processing needed for enabling and supporting the transmission, which is typically dependent on the current radio conditions and traffic load. It can generally be said that the cost for usage of network resources and radio resources for a data transmission is greater during periods of high traffic load than during periods of low traffic load when ample amounts of such resources are available and not used for other communications.

The wireless device may thus transmit data over a radio link using a connection to a base station or similar of a cellular network, referred to as a cellular connection, or using a connection to an access point of a WiFi network, referred to as a WiFi connection. For example, the wireless device discussed herein may be capable of using either a cellular connection or a WiFi connection. Transmission of data over a WiFi connection is often cheaper than over a cellular connection, due to different price ratings. The data discussed herein could be any type of data, such as measurements or media content as mentioned above, and the description is not limited in this respect.

For any types of wireless devices and networks, a problem has been recognized in that considerable amounts of data may be transmitted when the wireless network used is highly loaded by other traffic, thus causing further load on the network and its resources. Transmissions of data also occupy precious radio resources such that other communications over the network may have to be rejected or restricted, e.g. when the network capacity is not sufficient to accommodate all communications. Another problem is that such transmissions of data may rapidly drain the battery in the wireless device, particularly when the distance to the base station or access point is great requiring relatively high transmission power. It has further been recognized that such transmissions of data may in general generate high costs, e.g. in terms of energy consumption, resource usage, and price ratings.

In this solution it has also been recognized that when data is to be transmitted from a wireless device over a wireless network it may be advantageous to wait with performing the transmission, if tolerated by the data, until the cost for transmission becomes reduced, e.g. in terms of energy consumption, price ratings, and/or resource usage. It is not uncommon that wireless networks apply higher price ratings for transmissions during periods of intense traffic such as in the office hours, than in periods of less traffic when the load on the network resources and radio resources is comparatively low and there is abundant capacity available in the network. The price ratings are typically controlled by the network operator and price variations may have been scheduled in advance based on expected traffic load during the day, or the price may be adaptive by measuring the current traffic load and adjusting the price accordingly in a dynamic fashion.

This solution makes it possible to avoid transmitting data during periods with high cost, e.g. in terms of price ratings, provided that the transmission can wait until lower cost occur. This is accomplished by functionality in the wireless device which includes determining a delay tolerance of the data to be transmitted and determining a cost prediction for transmission of the data within the delay tolerance. The delay tolerance of the data is typically dependent on what the data is used for which in turn relates to which application is used for the data. Some applications require more or less immediate reception while others can tolerate some amount of delay before reception.

If the cost prediction indicates that the cost for transmitting the data at a later time within the delay tolerance is potentially lower than the cost for transmitting the data immediately, the wireless device may delay the data transmission. Otherwise, the wireless device can decide to transmit the data immediately when the cost prediction indicates that the cost is not likely to be reduced within the delay tolerance. The cost prediction may be determined in various different ways, e.g. based on predefined and known price rating schemes, expected traffic load, and/or anticipated change of connection between cellular and WiFi, which will be described in more detail later below.

An example of how this solution could be used in a practical communication scenario will now be described with reference to FIG. 1, which illustrates how a wireless device 100 moves from a cellular connection to a WiFi connection. A first action 1:1 thus indicates that the wireless device 100 has a cellular connection to a serving base station 102A of a cellular network 102. While having this cellular connection the wireless device 100 detects that it has data to transmit so as to arrive at some receiving end, as shown by a next action 1:2, which may e.g. involve some uploading, reporting or backup operation towards some server or data storage, not shown, to mention a few non-limiting examples.

It should be noted that the solution can be used for any types of data to be transmitted. In this disclosure it is simply assumed that the data is generated or obtained by an application running in the wireless device, and that the data is transmitted from the wireless device over a wireless link to a network node. The process of using or forwarding the data over further communication links and networks towards a receiving end is outside the scope of this solution and it is not necessary to describe any further. The receiving end is not shown in this figure which only concerns transmission from the wireless device 100 over a wireless link.

In order to avoid unnecessarily high cost for the data transmission, the wireless device 100 performs an evaluation as follows. A delay tolerance of the data to be transmitted is first determined which means basically the time when the data needs to be transmitted at the latest. The delay tolerance may be specified as an absolute point in time or by an amount of remaining time which is counted down towards expiry. The delay tolerance thus indicates how long the transmission can be delayed, i.e. how much delay can be tolerated by the data, without degrading or ruling out its usage or utility at the receiving end.

As mentioned above, the delay tolerance may be dependent on the type of data and/or application for which the data is intended to be used. For example, some applications such as speech conversation or real-time control of a machine operation or the like, may require immediate transmission of the data within a few milliseconds before it becomes obsolete and useless at the receiving end, while a regular backup or reporting operation can typically allow a delay of several minutes or even hours before the data needs to be received. It may be useful to classify data to be transmitted either as real-time data that basically requires immediate transmission without delay, or as delay tolerant data that can be delayed and transmitted later. The data to be transmitted may comprise at least one of these two types and the delay tolerant data may be classified further according to how much delay is tolerated. Further, the determined delay tolerance may be quite precise or more or less approximate. The delay tolerance may e.g. be defined by the application as a part of a data delay requirement or the like.

If the data detected in action 1:2 comprises delay tolerant data so that its delay tolerance is not virtually zero and thus allows for delaying the transmission to some extent, the wireless device 100 further determines a cost prediction for transmission of the data at some later point within the delay tolerance. The wireless device 100 may determine a cost prediction for a candidate connection which is anticipated to be used by the wireless device 100 within the delay tolerance. Cost predictions may also be determined for more than one candidate connection if it can be anticipated that several connections will be available for the wireless device 100 within the delay tolerance. The wireless device 100 may then decide to delay the data transmission or not, based on the cost prediction for the "cheapest" connection. In some further examples, it may be required that the difference between the current cost and the cheapest predicted cost exceeds a threshold, and possibly also that the probability the cheapest connection will occur exceeds another threshold, before deciding to delay the transmission.

In this example, the cost prediction indicates that the cost for transmitting the data will potentially be lower within the delay tolerance than at present, in this case by anticipating a less costly WiFi connection within the delay tolerance. As a result, the wireless device 100 decides to wait and thus delays the data transmission by not transmitting immediately, as shown by a further action 1:3. In another example, it may be predicted that the traffic load in the network 102 is likely to be reduced such that the transmission cost will accordingly become lower at some point within the delay tolerance, either by lower price rating or by having more free resources available in the network, or both.

A dashed arrow indicates that the wireless device 100 changes its position and is therefore able to establish a connection to a WiFi access point 104, as shown by a further action 1:4 which occurs before the above determined delay tolerance expires. The wireless device 100 now performs a new evaluation basically in the manner described above, which may include determining the delay tolerance and the cost prediction once again. This time, the cost prediction indicates that the cost for transmitting the data is not likely to be reduced any further within the delay tolerance, i.e. the remaining time before the data should be transmitted at the latest. Therefore, the wireless device 100 decides, in an action 1:5, to transmit the data immediately while using the connection to the WiFi access point 104, as shown by a final action 1:6. It is thus an advantage of this solution that the cost for transmission of the data can be reduced by waiting with performing the transmission until the cost has been predicted to be as low as possible, given the delay tolerance of the data.

There are many ways of determining the cost prediction which may further be more or less reliable, i.e. the future cost for data transmission may be predicted with different probability depending on the circumstances. For example, if it is known that the wireless device 100 often or always moves along a certain route same time every day, e.g. when it is located in a vehicle that habitually travels that route, it can be predicted with fairly high probability that it will connect to a certain WiFi access point 104 at some predictable point in time. If that time falls within the delay tolerance determined for some pending data, it can be decided to delay transmission of the data until the WiFi connection has been established to obtain a lower cost in terms of price ratings.

In another example, it may be foreseen with high probability that the traffic load will decrease during the evening or night, and it can therefore be decided to delay the data transmission until then, if occurring within the delay tolerance, to obtain a lower cost in terms of resource usage and/or price ratings. In yet another example, the wireless device 100 may be located quite far from its serving base station of a cellular network when pending data is detected, and it may be predicted with reasonable probability that the wireless device 100 is likely to move closer to its serving base station, or make handover to another base station within shorter distance, at some point within the delay tolerance. It can therefore be decided to delay the data transmission until less transmission power is needed to obtain a lower cost in terms of power consumption.

An example will now be described, with reference to the flow chart in FIG. 2, of how the solution may be employed in terms of actions which may be performed in a wireless device, such as the above-described wireless device 100, for handling transmission of data. Reference will sometimes also be made, without limiting the features described, to the example shown in FIG. 1. The procedure illustrated by FIG. 2 can thus be used to accomplish the functionality described above for the wireless device 100.

A first action 200 illustrates that the wireless device 100 determines a delay tolerance of the data to be transmitted. In some example embodiments, the data to be transmitted may comprise at least one of: real-time data that should be transmitted immediately, and delay tolerant data that can be transmitted later. Some illustrative but non-limiting examples of how the delay tolerance may be determined have been described above for the scenario of FIG. 1. In another example embodiment, the delay tolerance may be determined based on which type of application the data is used for, which may be more or less tolerant to delays in the data transmission.

In another example embodiment, the data may be comprised of multiple subsets of data and the delay tolerance may in that case be determined for each subset of data. In an optional action 202, the wireless device 100 may already at this early stage decide to transmit the data now without delay if the determined delay tolerance, here denoted T, is virtually zero. In this case there is thus no time to wait for potentially lower cost before transmission. In another example embodiment, if the data comprises multiple subsets of data the wireless device 100 may decide to transmit at least one subset of data immediately when the delay tolerance for said at least one subset of data is substantially zero.

If the delay tolerance T is not zero, the wireless device 100 further determines a cost prediction for at least one candidate connection for transmission of the data within the delay tolerance T of the data, as indicated by an action 204. In a following action 206, the wireless device 100 makes a decision whether to transmit the data immediately or at a later time within the determined delay tolerance, based on the determined delay tolerance and cost prediction. For example, the wireless device 100 may decide to transmit the data at a later time if the cost prediction indicates that the cost for transmitting the data at said later time is potentially lower than the cost for transmitting the data immediately. On the other hand, if the determined cost prediction indicates that the transmission cost is not likely to be reduced before the determined delay tolerance expires, there is no point in waiting and the data can be transmitted without delay.

If it is thus decided that the transmission should not be delayed in action 208, the wireless device 100 will transmit the data immediately in a further action 210. If it is decided that the transmission can be delayed in action 208, the wireless device 100 will wait in an action 212 and then return at a later point to action 200 and repeat the evaluation according to actions 200-208, until it is decided to transmit the data. It should be noted that the wait in action 212 should not exceed the determined delay tolerance so that the next evaluation can be performed within the determined delay tolerance, that is to allow transmission before the data becomes out-of-date and obsolete or useless to the receiving side.

Some further embodiments and examples of how the above procedure may be realized will now be outlined. In one example embodiment, the cost prediction may be determined as a function of time over a period within said delay tolerance of the data. Thereby, it can be detected whether the cost will potentially go down in the course of the delay tolerance duration, and also at which time the cost can be expected to be the lowest. An example of such a function of cost prediction over time will be discussed later below with reference to FIG. 8.

There are several ways of determining the above-mentioned cost prediction or cost function over time. In one further example embodiment, the cost prediction may be determined by using a machine learning function based on information about transmission costs depending on at least one of time of day, week or season, location, and radio technology. In this embodiment, information about transmission costs that have occurred for different wireless devices in different situations may be taken as input to the machine learning function so that the function can identify how the cost can be expected to vary over time and also depending on location and radio technology.

When the cost prediction is determined as a function of time, another example embodiment may be that the wireless device decides to transmit the data when the cost for transmitting the data is below a predefined threshold, which thus may represent an acceptable cost level. It is also possible to transmit the data at the lowest predicted cost level, as mentioned above. However, the above examples are optional and the solution is not limited to selecting any particular cost level at which the data is transmitted. In some further example embodiments, the cost for transmitting the data may be related to at least one of: energy consumption, price ratings, and resource usage. These factors have been discussed above.

In another example embodiment, the at least one candidate connection may be identified based on statistics of previous connections used by the wireless device and of costs associated with said previous connections. It was mentioned above that a cost prediction is determined for at least one candidate connection, which implies that it can be determined for multiple candidate connections, e.g. for a cellular connection and for a WiFi connection which may be used by the wireless device at times within the delay tolerance. In another example embodiment, cost predictions may thus be determined for multiple candidate connections and one of the candidate connections may then be selected for transmission of the data based on the determined cost predictions. In this embodiment, a cost prediction is determined for each candidate connection so that the cost predictions can be compared in order to choose one of them that is most favourable or useful for further evaluation. Further, the likelihood for connection usage may also be considered so that the cost prediction may be chosen for the connection that is most likely to be used by the wireless device within the delay tolerance.

If multiple cost predictions are determined, another example embodiment may be that the cost predictions are determined based on predefined transmission price plans for the respective candidate connections. The term "price plan" basically represents a scheme or the like indicating how the transmission price or price ratings varies over time for a respective connection, which is typically determined by the network operator that provides the connection. In this embodiment, it is assumed that the wireless device has access to such transmission price plans for the candidate connections, e.g. in the form of supplied subscription parameters or the like, or this information may be regularly broadcasted by base stations or access points in the network. In another example embodiment, the candidate connection that provides the lowest cost within said delay tolerance of the data may be selected for transmission of the data.

Figures 3, 4, 5:
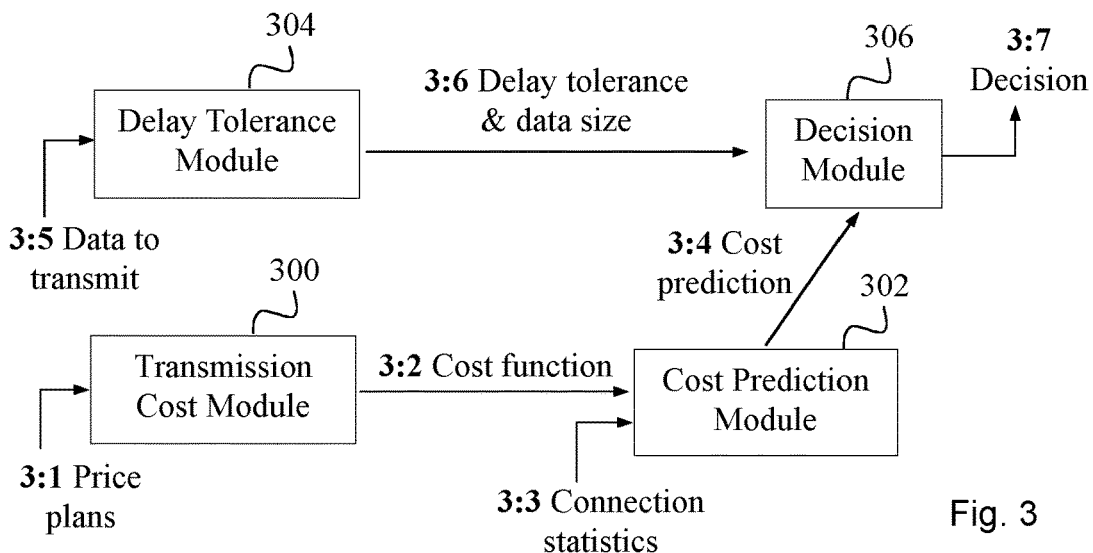
FIG. 3 is a block diagram illustrating an example of how some functional modules may operate in a wireless device, according to further possible embodiments.
FIG. 4 is a table containing some examples of information about data pieces, according to further possible embodiments.
FIG. 5 is an example table illustrating how costs may vary over time for different connections, according to further possible embodiments.

FIG. 3 illustrates a non-limiting example of how the above-described functionality in the wireless device may be implemented in practice when there is data to transmit.

In this figure, different functional modules 300-306 can be employed in the described wireless device 100 and they may be configured to perform the determinations and decisions described herein. It should be noted that the modules are named basically to indicate their respective functions, and these names are just non-limiting examples. The modules 300-306 should be seen as logical entities that may be realized by a computer program that is executed in the wireless device.

In this example, a "transmission cost module" 300 uses price plans obtained from one or more wireless networks in an action 3:1, as a basis for generating a cost function over time for one or more candidate connections in an action 3:2. Then, a "cost prediction module" 302 uses the above cost function as well as cost statistics for connections that the device has used previously for transmitting data, here denoted connection statistics as shown by an action 3:3, as a basis for generating a cost prediction for the wireless device when using the respective candidate connection(s), in an action 3:4.

In an action 3:5, a "delay tolerance module" 304 takes the data to transmit as a basis for determining delay tolerance and data size, in another action 3:6. In a simple example, the delay tolerance may just be indicated as either real-time or delay-tolerant. In a more advanced example, the delay tolerance may be classified according to how much delay can be tolerated. The delay tolerance and data size of action 3:6 and the cost prediction of action 3:4 may basically be determined independently, e.g. at the same time in parallel, or the cost prediction may be determined before or after determining the delay tolerance and data size. In either case a "decision module" 306 finally uses the delay tolerance and data size from module 304 together with the cost prediction from module 302 as a basis for deciding whether to transmit the data now or later, as shown in an action 3:7. The data size may be needed to determine how long the actual transmission will last once it is started, to ensure that the transmission is completed before the delay tolerance expires.

It was mentioned above that the data may include multiple subsets of data and that the delay tolerance may in that case be determined for each subset of data.

FIG. 4 is a table illustrating an example of how data sizes and delay tolerances have been determined for 4 different subsets of data to be transmitted, here denoted data pieces. According to this example data piece 1 has the largest data size of 10 megabits, MB, and it can tolerate a delay of 30000 seconds, i.e. 8.3 hours. It may therefore be desirable to delay the transmission of this data piece if the cost can be reduced by later transmission, in manner described above. On the other hand, data piece 3 has a data size of 500 kilobits, kB, but its delay tolerance is zero, which means that this data piece must be transmitted immediately, and so forth.

The table in FIG. 5 illustrates some schematic cost predictions for different connections where the cost may vary over time, as indicated by four time intervals within the 24 hours of a day. It can be noted that the cost of using WiFi 1 is zero at all times, while the cost of using WiFi 1 is 1 during most hours except at night when it is zero. It can also be noted that the cost of using cellular connections is considerably larger than using the WiFi connections. The cost variations may be predefined according to a preset price plan and/or adaptive e.g. depending on the traffic load.

Another more detailed example of a procedure performed by a wireless device will now be described with reference to the flow chart in FIG. 6. In a first action 600, the wireless device obtains data to be transmitted. The wireless device then determines the delay tolerance T of the obtained data, in an action 602, which corresponds to action 200 in FIG. 2. If it is found in an action 604 that the delay tolerance T is virtually zero, i.e. no delay is tolerated by the data, the wireless device decides to transmit the data immediately without delay, in an action 606.

If the delay tolerance T is not zero in action 604, the wireless device proceeds to action 608 and identifies one or more candidate connections based on connection statistics which have been recorded by the wireless device when being connected to various network nodes which may include cellular base stations or WiFi access points. The connection statistics may indicate that the wireless device can be expected, with some probability, to be connected to either of the candidate connections during a period within the delay tolerance T. In an example, the connection statistics may indicate that the wireless device has moved back and forth between two or more specific network nodes for some time before the data was obtained, and it may be concluded that the wireless device is likely to continue this pattern or behaviour throughout the delay tolerance T.

Figure 2:
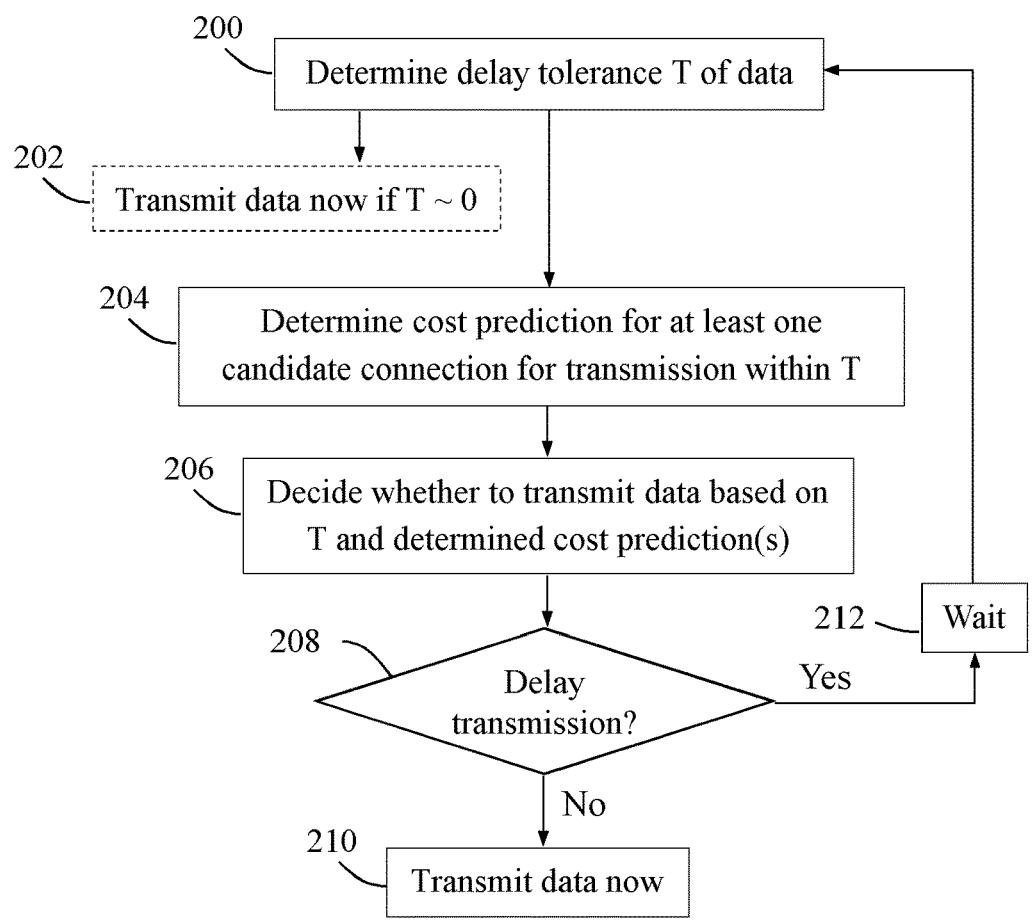
FIG. 2 is a flow chart illustrating a procedure in a wireless device, according to further possible embodiments.

In a next action 610, the wireless device determines a cost prediction for each of the candidate connections within the delay tolerance T, which corresponds to action 204 in FIG. 2. Some examples have been described above of how cost predictions could be made. Then the wireless device selects one of the candidate connections which can provide the lowest transmission cost according to the cost predictions, in a following action 612.

It is then checked in an action 614 whether the transmission cost of the selected candidate connection, denoted "candidate cost" is lower than the transmission cost of the wireless device's current connection, denoted "current cost". If not, the wireless device decides to transmit the data using the current connection according to action 606. On the other hand, if the candidate cost is lower than the current cost, the wireless device decides to wait in an action 616 and then repeats the evaluation by performing actions 602-614 once again. These actions may be repeated any number times until it is found in action 614 that the candidate cost is not lower than the current cost, e.g. when the wireless device has become connected to the selected candidate connection which means that the current cost should correspond to the candidate cost. The waiting time in action 616 may be predefined, e.g. as a fixed duration or a gradually decreasing duration depending on how many times the evaluation has been made. Naturally, if the data has not been transmitted when the delay tolerance T expires, the data will be transmitted at that point anyway using the current connection.

Figure 7:
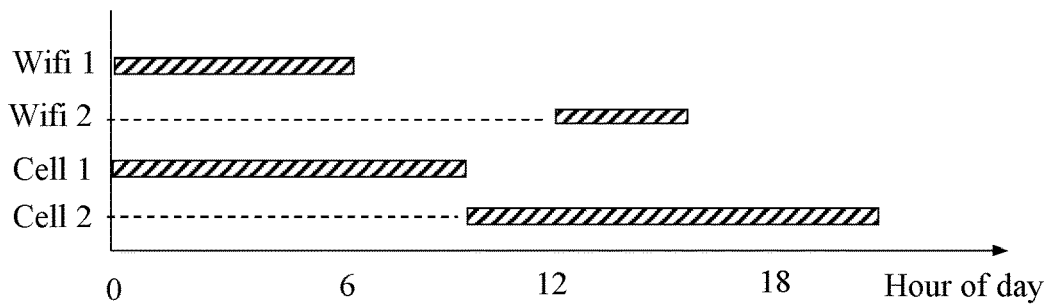
FIG. 7 is a diagram illustrating an example of how different connections may be available for a wireless device over time, according to further possible embodiments.

It was mentioned above for action 608 that candidate connections can be identified based on connection statistics including various network nodes that the wireless device have been connected to in the past. FIG. 7 is a diagram illustrating an example of how such connection statistics may be recorded during a day. In this example the wireless device encounters two WiFi connections and two cellular connections such that both WiFi 1 and cell 1 are encountered at the same time during hours 0-6, while the wireless device moves to cell 2 around hour 9 and also encounters WiFi 2 for a few hours after 12, and so forth. By recording such connection patterns the wireless device is able to obtain connection statistics from several days.

Figure 8:
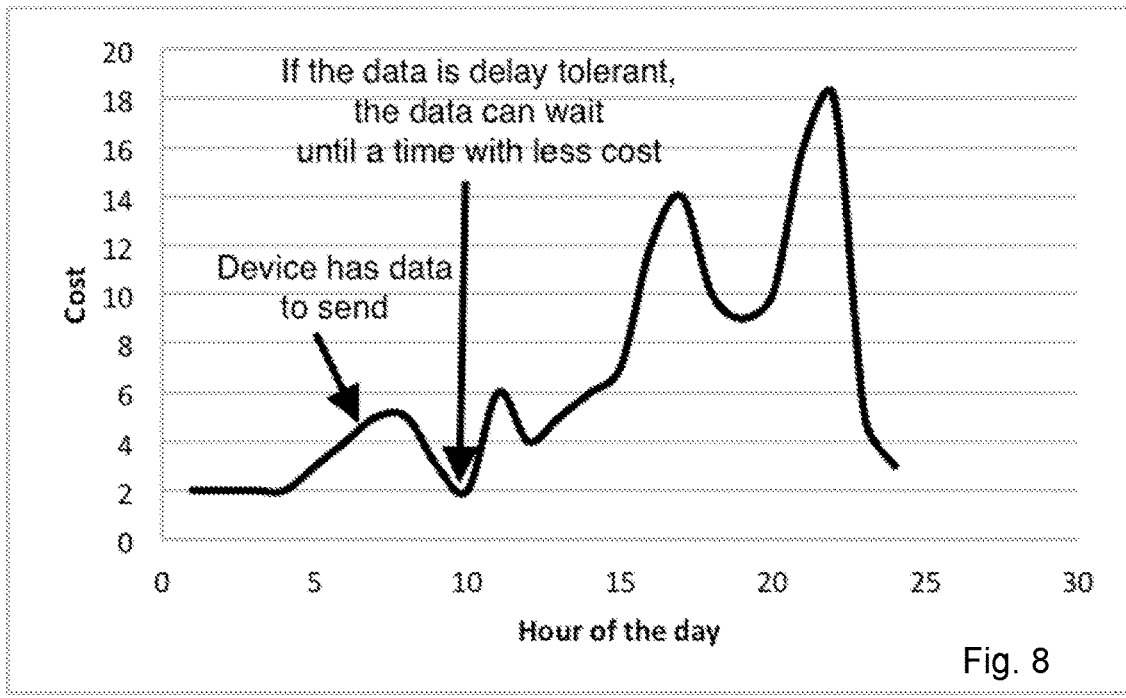
FIG. 8 is a diagram illustrating an example of how costs may vary for a wireless device over time, according to further possible embodiments.

FIG. 8 is another diagram illustrating an example of how the actual cost may vary for a wireless device during a day, which may include fixed price variations as well as more dynamically changing cost e.g. depending on traffic load, radio conditions and distance to serving network node. Both the fixed and dynamic cost variations may be predictable to some extent, as discussed above. It is indicated in this figure that the wireless device has data to transmit at around hour 7 which data has a delay tolerance that allows a transmission delay that in this example lasts for a few hours at least. Assuming that these cost variations can be anticipated to some extent by determining a cost prediction as described herein, the wireless device is able to decide to delay transmission of the data until a minimum is reached, which is indicated in the figure around hour 10. According to this diagram the transmission cost will be reduced from 4 to 2 by performing the data transmission at hour 10 instead of at hour 7 when the data was obtained, thus reducing the transmission cost by 50%.

Figure 9:
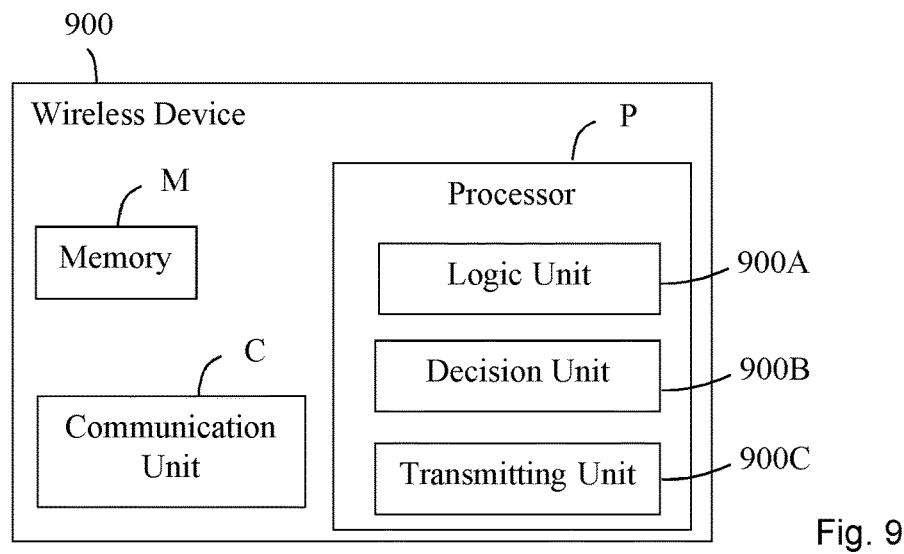
FIG. 9 is a block diagram illustrating a wireless device in more detail, according to further possible embodiments.

The block diagram in FIG. 9 illustrates a detailed but non-limiting example of how a wireless device 900 may be structured to bring about the above-described solution and embodiments thereof. The wireless device 900 may be configured to operate according to any of the examples and embodiments of employing the solution as described above, where appropriate, and as follows. The wireless device 900 is shown to comprise a processor P and a memory M, said memory comprising instructions executable by said processor P whereby the wireless device 900 is operative as described herein. The wireless device 900 also comprises a communication circuit C with suitable equipment for transmitting data in the procedure described herein.

The communication circuit C is configured for communication with network nodes such as base stations and/or access points using suitable protocols depending on the implementation. This communication may be performed in a conventional manner over a cellular network or a WiFi network, although the solution is not limited to such networks, employing radio links for wireless communication with the network nodes involved, which is not necessary to describe here as such in any detail. The solution and embodiments herein are thus not limited to using any specific types of technology or protocols for wireless communication.

Figure 6:
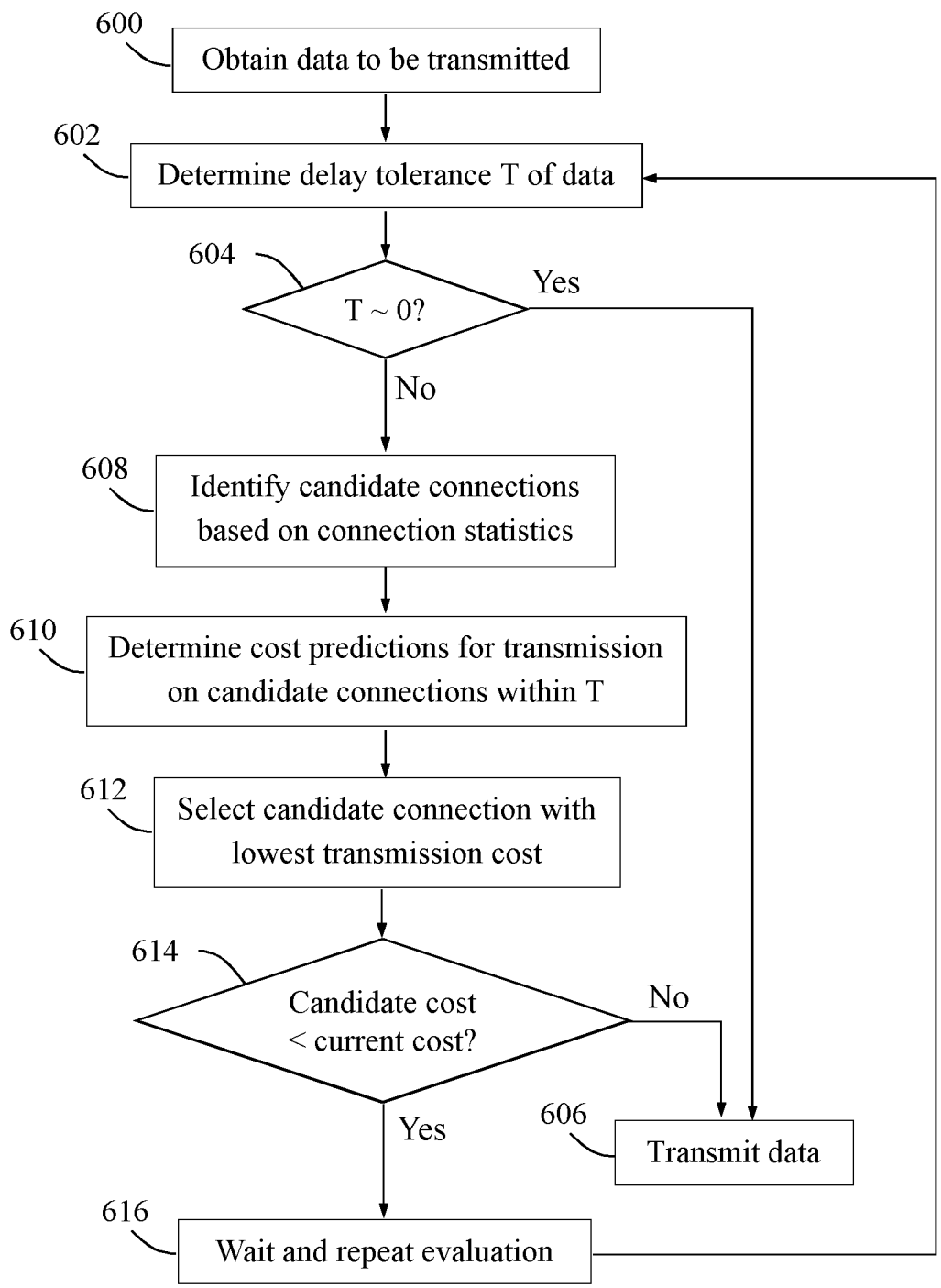
FIG. 6 is a flow chart illustrating a more detailed example of a procedure in a wireless device, according to further possible embodiments.

The wireless device 900 comprises means configured or arranged to perform at least some of the actions 200-212 and 600-616 of the flow charts in FIGS. 2 and 6, respectively, and optionally also in accordance with any of the examples described for FIGS. 1 and 3. The wireless device 900 is arranged to handle transmission of data.

The wireless device 900 is configured to determine a delay tolerance of the data to be transmitted. This operation may be performed by a logic unit 900A in the wireless device 900, e.g. in the manner described for action 200 above. The wireless device 900 is further configured to determine a cost prediction for at least one candidate connection for transmission of the data within said delay tolerance of the data. This operation may be performed by the logic unit 900A, e.g. as described for action 204 above.

The wireless device 900 is further configured to decide whether to transmit the data immediately or at a later time within the determined delay tolerance, based on the determined delay tolerance and cost prediction. This operation may be performed by a decision unit 900B in the wireless device 900, e.g. as described for action 206 above. The wireless device 900 is also configured to transmit the data according to decision. This operation may be performed by a transmitting unit 900C in the wireless device 900, e.g. as described for action 210 above.

It should be noted that FIG. 9 illustrates various functional units in the wireless device 900, and the skilled person is able to implement these functional units in practice using suitable software and hardware. Thus, the solution is generally not limited to the shown structures of the wireless device 900, and the functional units 900A-C therein may be configured to operate according to any of the features and embodiments described in this disclosure, where appropriate.

The functional units 900A-C described above can be implemented in the wireless device 900 by means of suitable hardware and program modules of a computer program comprising code means which, when run by the processor P causes the wireless device 900 to perform at least some of the above-described actions and procedures. The processor P may comprise a single Central Processing Unit (CPU), or could comprise two or more processing units. For example, the processor P may include a general purpose microprocessor, an instruction set processor and/or related chips sets and/or a special purpose microprocessor such as an Application Specific Integrated Circuit (ASIC). The processor P may also comprise a storage for caching purposes.

Each computer program may be carried by a computer program product in the wireless device 900 in the form of a memory having a computer readable medium and being connected to the processor P. The computer program product or memory in the wireless device 900 may thus comprise a computer readable medium on which the computer program is stored e.g. in the form of computer program modules or the like. For example, the memory may be a flash memory, a Random-Access Memory (RAM), a Read-Only Memory (ROM), an Electrically Erasable Programmable ROM (EEPROM) or hard drive storage (HDD), and the program modules could in alternative embodiments be distributed on different computer program products in the form of memories within the wireless device 900.

The solution described herein may be implemented in the wireless device 900 by means of a computer program storage product comprising instructions which, when executed on at least one processor, cause the at least one processor to carry out the actions according to any of the above embodiments, where appropriate.

Advantages that may be accomplished when using the solution and embodiments described herein include the possibility to reduce or even minimize the cost for transmitting data from a wireless device by delaying transmission until the cost becomes lower, provided that the data can wait without becoming obsolete or useless at the receiving side. This is made possible by the determination of delay tolerance and cost prediction for transmission within said delay tolerance. Such reduced cost may be beneficial not only for the device user by paying less for the transmission and/or by less energy consumption and drainage of battery, but also for the wireless network used for the transmission by avoiding usage of precious radio resources and network resources at times when the traffic load is high, as explained above.

Figure 10:
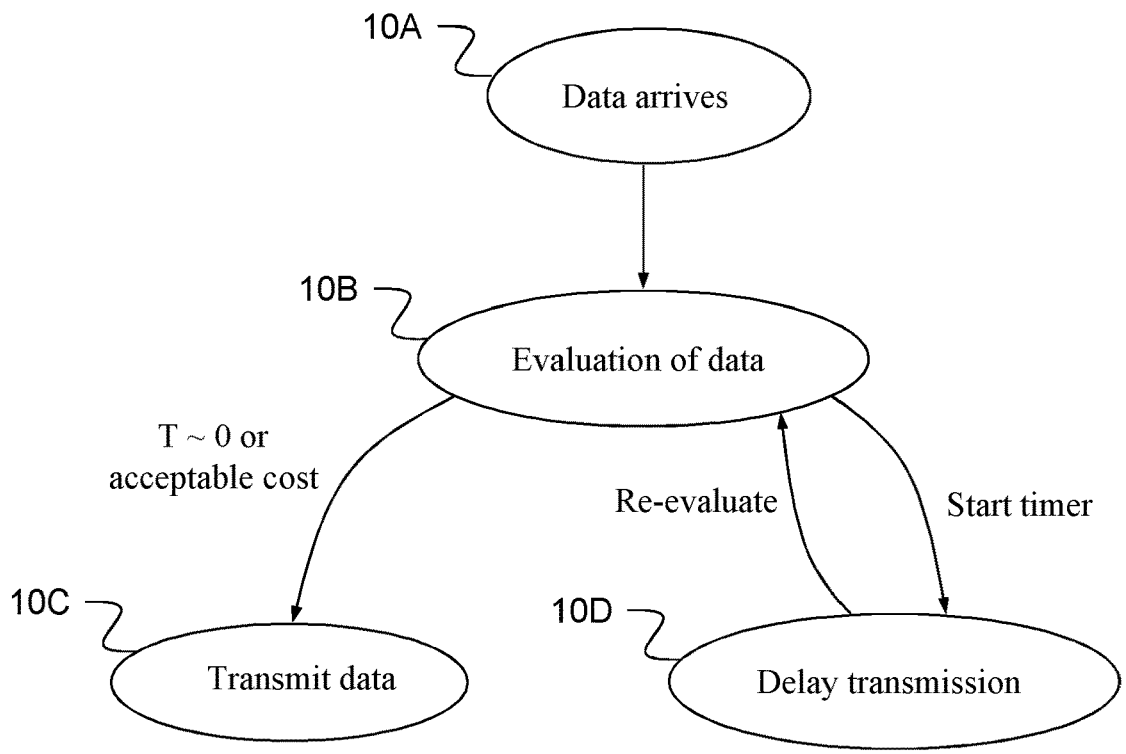
FIG. 10 is a state diagram illustrating an example of how a wireless device may enter different states, according to further possible embodiments.

FIG. 10 is a state diagram that illustrates schematically how a wireless device may enter different states in the procedure described herein. In a first state 10A data arrives at the device for transmission. The device then enters a second state 10B when the above-described evaluation of the data is performed, including determination of delay tolerance T and cost prediction(s). If the wireless device decides to transmit the data, e.g. when T is virtually zero or when the current transmission cost is at a minimum or at least acceptable, the device enters a third state 10C where the data is transmitted using its current connection. Alternatively, the device may decide to delay the transmission if lower costs can be anticipated within the delay tolerance T, and a timer is then started to measure the waiting time and the device enters a fourth state 10D of delaying the transmission. When the timer expires the device returns to state 10B and re-evaluates the data once more in the manner described above which may result in entering state 10C or returning to state 10D.

Figure 11:
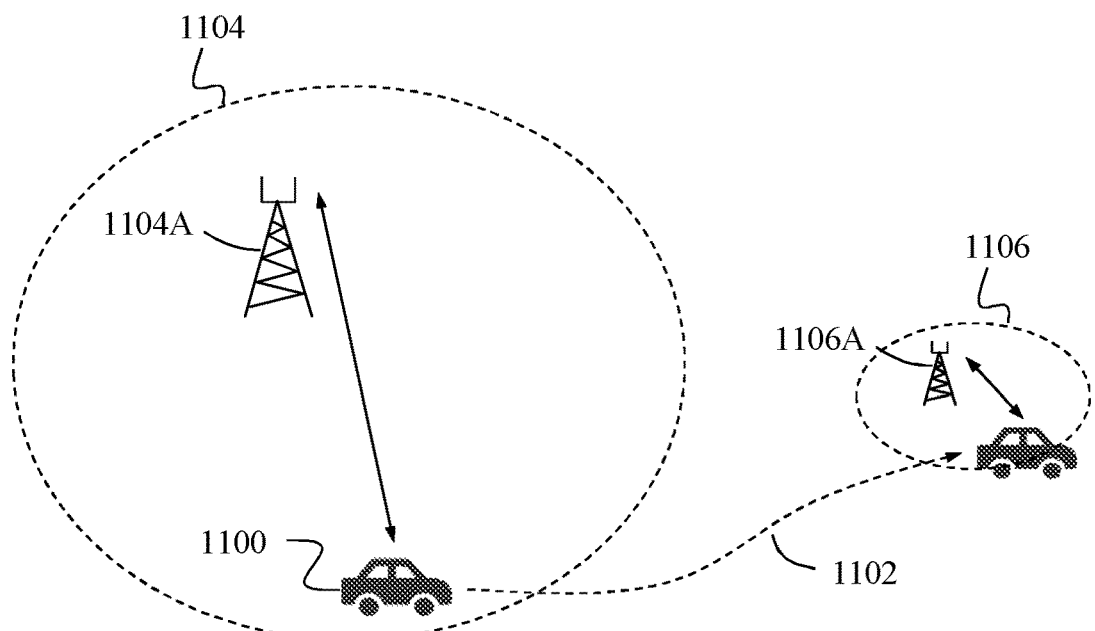
FIG. 11 is a communication scenario illustrating another example where the solution may be employed, according to further possible embodiments.

Finally, FIG. 11 illustrates that the wireless device described herein is an M2M device, not shown, situated on a vehicle 1100 and configured to automatically perform some measurements or observations on the vehicle or on road traffic encountered when the vehicle travels on a preset route 1102. The vehicle 1100 is further configured to report data of the measurements or observations at regular intervals, e.g. every ten minutes, to a central server or the like. It is assumed that this data is quite delay-tolerant and a certain delay in the data transmissions can thus be tolerated.

The figure illustrates that the vehicle 1100 has a connection to a base station 1104A of a cellular network when driving in a cell 1104, and that the vehicle 1100 then switches connection to another base station 1106A when moving into another cell 1106. These connections can be foreseen since the vehicle 1100 travels the same route 1102 at preset hours, e.g. every day, and corresponding connection statistics can thus be generated. Based on such connection statistics, cost predictions can be determined whenever data is obtained for transmission. In this example, the vehicle's distance to base station 1106A is considerably shorter than its distance to base station 1104A, which means that the transmission cost in terms of battery consumption can be predicted to be lower when the vehicle 1100 is in cell 1106 than when being in cell 1104. It would thus be beneficial to delay a data transmission until the vehicle enters cell 1106 so as to achieve lower transmission cost.

While the solution has been described with reference to specific exemplifying embodiments, the description is generally only intended to illustrate the inventive concept and should not be taken as limiting the scope of the solution. For example, the terms "wireless device", "data", "cost", "delay tolerance", "cost prediction" and "candidate connection" have been used throughout this disclosure, although any other corresponding entities, functions, and/or parameters could also be used having the features and characteristics described here. The solution is defined by the appended claims.

The invention claimed is:

1. A method performed by a wireless device for handling transmission of data, the method comprising:
    determining a delay tolerance of the data to be transmitted, wherein the delay tolerance indicates an acceptable time window;
    predicting a first cost of transmitting the data at a future point in time within the acceptable time window;
    using the predicted first cost to decide whether to defer transmission of the data until at least said future point in time; and
    transmitting the data according to decision, wherein
    predicting the first cost comprises determining a probability that the wireless device will be within a certain area at the future point in time.

2. The method of claim 1, the method further comprising:
    determining a cost of transmitting the data immediately; and
    comparing the first cost of transmitting the data at the future point in time with the cost of transmitting the data immediately.

3. A wireless device arranged to handle transmission of data, wherein the wireless device is configured to:
    determine a delay tolerance of the data to be transmitted, wherein the delay tolerance indicates an acceptable time window,
    predict a first cost of transmitting the data at a future point in time within the acceptable time window,
    use the predicted first cost to decide whether to defer transmission of the data until at least said future point in time, and
    transmit the data according to decision, wherein
    predicting the first cost comprises determining a probability that the wireless device will be within a certain area at the future point in time.

4. The wireless device according to claim 3, wherein the wireless device is configured to decide to defer transmission of the data until at least said future point in time if the predicted first cost indicates that a predicted cost of transmitting the data at said future point in time is lower than a cost of transmitting the data immediately.

5. The wireless device according to claim 3, wherein the data to be transmitted comprises at least one of: real-time data that should be transmitted immediately or delay tolerant data that can be transmitted later.

6. The wireless device according to claim 3, wherein the wireless device is configured to determine the delay tolerance based on which type of application the data is used for.

7. The wireless device according to claim 3, wherein the wireless device is configured to predict the first cost as a function of time over a period within said delay tolerance of the data.

8. The wireless device according to claim 7, wherein the wireless device is configured to predict the first cost by using a machine learning function based on information about transmission costs depending on at least one of time of day, week or season, location, or radio technology.

9. The wireless device according to claim 7, wherein the wireless device is configured to decide to transmit the data when the predicted first cost for transmitting the data is below a predefined threshold.

10. The wireless device according to claim 3, wherein the predicted first cost for transmitting the data is related to at least one of: energy consumption, price ratings, or resource usage.

11. The wireless device according to claim 3, wherein
    the predicted first cost is associated with a first candidate connection, and
    the wireless device is configured to identify the first candidate connection based on statistics of previous connections used by the wireless device.

12. The wireless device according to claim 3, wherein
    the predicted first cost is associated with a first candidate connection,
    the wireless device is further configured to predict a second cost for transmission of the data at said future point in time, wherein said predicted second cost is for a second candidate connection, and
    the step of using the predicted first cost to decide whether to defer transmission of the data until at least said future point in time comprises using both the first and second costs to decide whether to transmit the data immediately or to defer transmission of the data until at least said future point in time.

13. The wireless device according to claim 12, wherein the wireless device is configured to determine said predicted first and second costs based on predefined transmission price plans for the respective first and second candidate connections.

14. The wireless device according to claim 12, wherein the wireless device is configured to select a candidate connection that provides the lowest cost within said delay tolerance of the data, for transmission of the data.

15. The wireless device according to claim 3, wherein the data is comprised of multiple subsets of data and the wireless device is configured to determine the delay tolerance for each subset of data.

16. The wireless device according to claim 15, wherein the wireless device is configured to decide to transmit at least one subset of data immediately when the delay tolerance for said at least one subset of data is substantially zero.

17. The wireless device of claim 3, wherein the wireless device is further configured to:
    determine a cost of transmitting the data immediately; and
    compare the first cost of transmitting data at said future point in time with the cost of transmitting the data immediately.

18. A computer program product comprising a non-transitory computer readable medium storing instructions which, when executed on at least one processor, cause the at least one processor to:
- determine a delay tolerance of the data to be transmitted, wherein the delay tolerance indicates an acceptable time window;
- predict a first cost for transmitting the data at a future point in time within the acceptable time window;
- use the predicted first cost to decide whether to i) transmit the data immediately or ii) defer transmission of the data until at least said future point in time; and
- transmit the data according to decision, wherein
- predicting the first cost comprises determining a probability that the wireless device will be within a certain area at the future point in time.

19. A method performed by a wireless device, the method comprising:
- obtaining data;
- determining an acceptable transmission window for the data;
- predicting a cost of transmitting the data at a first point in time within the transmission window;
- using the predicted cost of transmitting the data, determining a probability value that indicates a probability that transmitting the data at the first point in time within the transmission window would cost less than transmitting the data at or before a second point in time within the transmission window, wherein the first point in time is later than the second point time; and
- deciding, based on the probability value, whether to transmit the data immediately or to defer transmission of the data until at least said first point in time.

20. The method of claim 19, wherein deciding, based on the probability value, whether to transmit the data immediately or to defer transmission of the data until at least said first point in time comprises determining whether the probability value satisfies a condition, wherein the probability value satisfies the condition when the probability value exceeds a threshold.

21. The method of claim 19, wherein determining the probability value comprises determining a probability that the wireless device will be within a certain area at the first point in time.

22. The method of claim 19, wherein determining the probability value comprises determining an expected traffic load at the first point in time.

* * * * *